United States Patent [19]

Berwanger

[11] Patent Number: 5,154,262
[45] Date of Patent: Oct. 13, 1992

[54] BRAKE PISTON ADJUSTER MECHANISM

[75] Inventor: Fred W. Berwanger, South Bend, Ind.

[73] Assignee: Allied-Signal Inc., Morristown, N.J.

[21] Appl. No.: 748,311

[22] Filed: Aug. 21, 1991

[51] Int. Cl.⁵ ............................................. F16D 65/54
[52] U.S. Cl. ................................. 188/196 R; 72/283;
    72/479; 188/71.8; 188/374; 192/20.25; 192/111 A
[58] Field of Search ................. 188/71.8, 196 R, 374,
    188/375; 192/70.25, 111 A; 72/283, 479

[56] References Cited

U.S. PATENT DOCUMENTS

| | | | |
|---|---|---|---|
| 3,887,047 | 6/1975 | Harnish et al. | 188/196 R |
| 3,958,670 | 5/1976 | Anderson | 188/196 R |
| 4,192,407 | 3/1980 | Crossman | 188/196 R |

FOREIGN PATENT DOCUMENTS

| | | | |
|---|---|---|---|
| 952977 | 11/1956 | Fed. Rep. of Germany | 72/283 |
| 458732 | 12/1936 | United Kingdom | 72/283 |

Primary Examiner—George E. A. Halvosa
Attorney, Agent, or Firm—Larry J. Palguta; Leo H. McCormick, Jr.; Robert A. Walsh

[57] ABSTRACT

The brake piston adjuster mechanism includes an expandable or deformable tube (80) which is attached to the piston (60) and engaged by a deforming member comprising a pin (190) having a threaded end (194) receiving thereon a nut (193) and tube expander (192). The nut (193) biases the tube expander (192) against a chamfered pin shoulder (191). The tube expander (192) has at least one inner diameter chamfer (198) which engages the chamfered pin shoulder (191) in order to impose preload forces upon the chamfered pin shoulder (191) and reduce stresses at a smaller diameter portion (195) of the pin. The (193) nut may be a castellated nut (193) which receives a locking wire or pin (200) extending through an opening (199) in the threaded end (194) of the pin (190). Alternatively, the tube expander and nut may comprise a one-piece expander nut (293, 393, 493) having an enlarged radially extending end poriton (294, 394, 494) and the nut (293, 393, 493), when advanced along the threads of the pin (190), causes a chamfer (298, 398, 498) of the end portion (294, 394, 494) to advance along the chamfered pin shoulder (191) and cause the end portion (294, 394, 494) to deform elastically, improving the preload retention of the connection.

8 Claims, 3 Drawing Sheets

BRAKE PISTON ADJUSTER MECHANISM

The present invention relates generally to a brake piston adjuster mechanism, and in particular to an improved adjuster pin, tube expander and nut combination or to an adjuster pin and a single expander nut, which eliminate problems in prior adjuster mechanisms.

Prior aircraft brake piston adjuster mechanisms utilize an adjuster pin which incorporates a right angle shoulder against which is biased a tube expander. U.S. Pat. No. 4,751,985 illustrates a prior tube adjuster construction wherein the rod or pin 90 has a threaded end upon which is mounted a ball or tube expander 92 held in place by a self-locking nut 93 threaded onto the end of the pin 90. As shown in greater detail in FIG. 1 of the present application, the pin 90 includes a shoulder 91 which is engaged by the tube expander 92 via the tightened nut 93. The smaller diameter portion 95 of pin 90 is a result of the pin being undercut thereat in order to provide a radius from the shoulder to the threaded diameter. When the nut 93 is tightened, the forces imposed by nut 93 upon tube expander 92 are transmitted to the shoulder 91. The reduced cross-sectional area or smaller diameter portion 95 of this design comprises a highly stressed region of pin 90. Because weight and space constraints limit the outer diameter dimension of pin 90, a larger diameter pin cannot always be provided in order to eliminate stress cracking at portion 95. The adjuster mechanism illustrated in FIG. 1 effects a short coupling of forces between the adjuster nut 93 and shoulder 91, such that minute amounts of nut rotation can result in a correspondingly large reduction in the nut preload. This may happen either as a result of brake-induced vibration, or when the nut 93 is turned to align a locking detent of the nut during installation. Loss of the nut preload can result in adjuster malfunction as a result of the shifting of transverse loading from the shoulder 91 to the threaded end of the pin 90, thereby increasing bending loads in portion 95 (which may be compounded by increased vibratory displacement in the loose condition), and leading to pin fracture. Also, higher-ranged axial load cycles at the shoulder to pin thread transition region may result in premature thread failure. Also, a self-locking adjuster nut may simply back off.

It is highly desirable to provide an improved brake pin adjuster mechanism which effectively eliminates the above problems, while providing a simple and easily manufacturable device. It is desirable that the adjuster mechanism be highly reliable, low cost, and comprise as few parts as possible. The present invention provides solutions to the above problems by providing a brake piston adjuster mechanism, comprising a deformable member disposed within and connected with a piston, a deforming member received within said deformable member and engaging the deformable member, the deforming member comprising a pin having a threaded end, an expander member disposed about a smaller diameter portion of said pin and adjacent the threaded end, a nut threaded on said threaded end and engaging said expander member, a chamfered pin shoulder disposed between an outer pin diameter and said smaller diameter portion, and the expander member having at least one inner chamfer which engages the chamfered pin shoulder, such that forces imparted by the nut upon the expander member are transmitted to the chamfered pin shoulder and impart tangential stress in the expander member.

The invention is described in detail below with reference to the drawings which illustrate embodiments in which.

Figure 2:
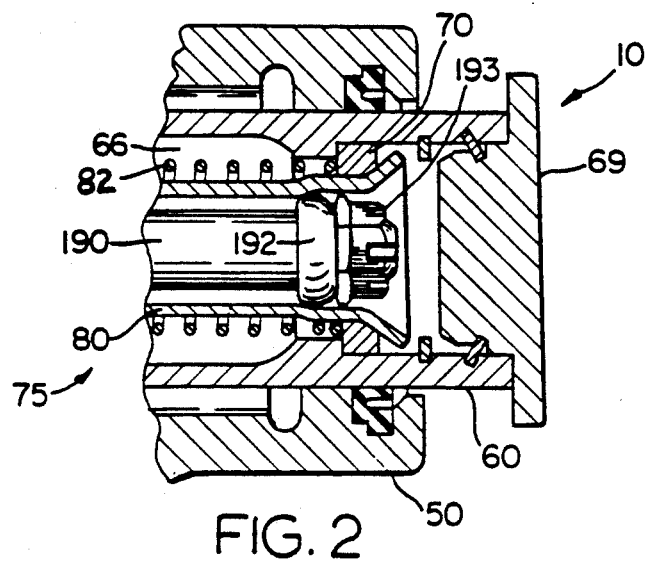
FIG. 2 is a section view of the brake piston adjuster mechanism of the present invention.
Figure 1:
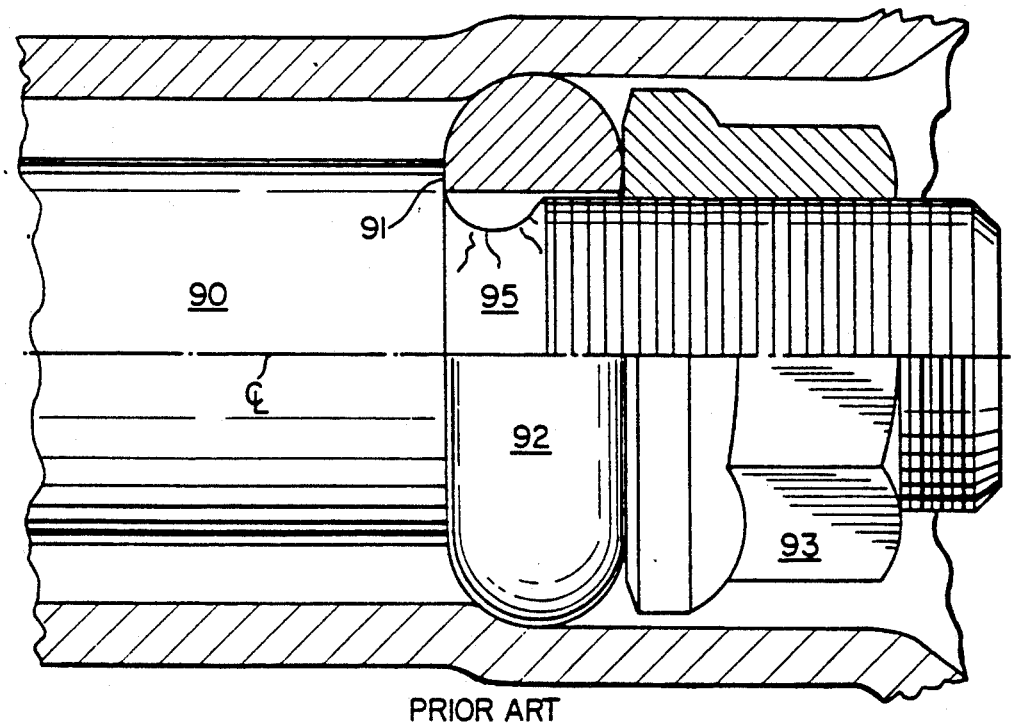
FIG. 1 is a detailed section view of a portion of a prior brake adjuster mechanism.
Figure 3:
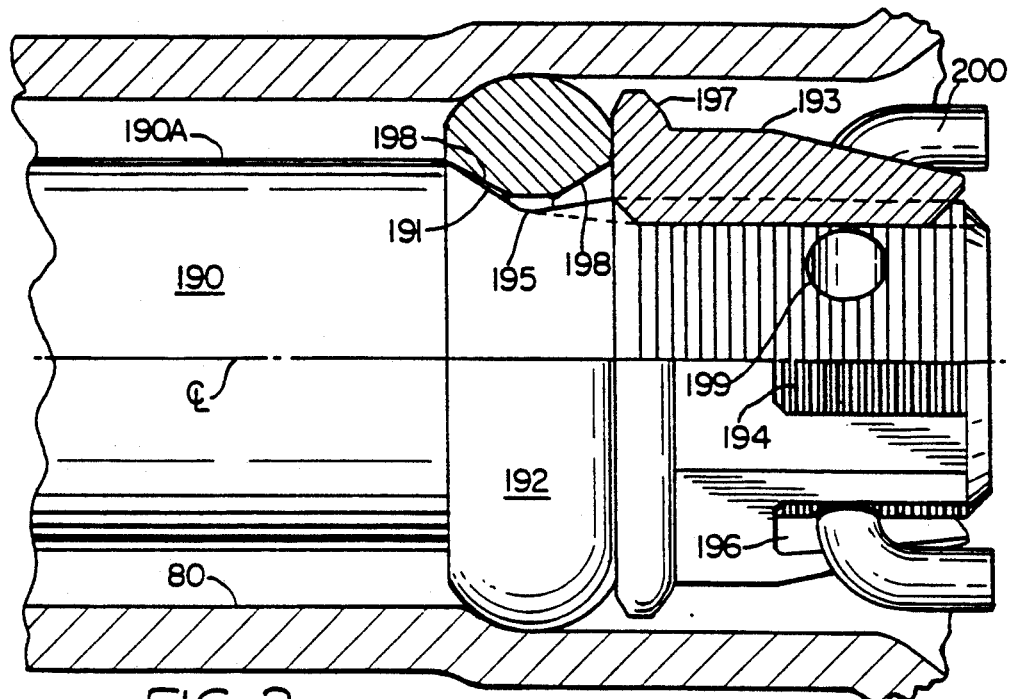
FIG. 3 is a detailed section view of a portion of the brake piston adjuster mechanism illustrated in FIG. 2.

Referring to FIGS. 2 and 3, an aircraft brake piston mechanism is indicated generally by reference numeral 10 and includes piston sleeve 50 which receives slidably therein brake piston 60. Brake piston 60 includes enlarge end flange 69 for actuating friction members (not shown) of the brake, and internal cavity 66. Extending within piston cavity 66 is a brake piston adjuster mechanism 75 comprising adjuster tube or deformable member 80 which is attached to piston 60 via ring 70. Ring 70 and tube 80 are biased by spring 82 which engages the other end of the piston 60. Located within tube 80 is anchored adjuster pin 190 which includes tube expander 192 located at one end adjacent nut 193. Pin 190 includes smaller diameter threaded end 194 (FIG. 3) which extends to smaller diameter portion 195 and chamfered shoulder 191 that terminates at outer diameter 190A. Nut 193 has internal threads engaging the threads of threaded end 194, and includes enlarged diameter portion 197. Tube expander or deforming member 192 comprises an annular member having at least one internal chamfer 198, which engages the chamfered shoulder 191 of pin 190. Threaded end 194 includes transfers through openings 199 one of which receives therethrough a locking means comprising a securement wire or cotter pin 200. Openings 199 are located at a right angle relative to one another. Nut 193 is a castellated nut whose plurality of openings 196 about the perimeter thereof provide a means for wire or pin 200 to pass therethrough and enable a locking of nut 193 in position on threaded end 194. Self-locking threads may be incorporated in addition to or in place of the wire or cotter pin.

As a result of chamfer 198 of tube expander 192 engaging chambered shoulder 191 of pin 190, there is a transfer to chamfered shoulder 191 of a greater portion of the transverse loading effected by tube 80 upon expander 192. This reduces bending loads at the end of the pin, and in particular the smaller diameter portion 195. Chamfered shoulder 191 provides an increased cross-sectional area and moment of inertia at the shoulder 191 to threaded end 194 transition, which results in a more direct axial stress flow and which also eliminates the requirement for an undercut diameter portion at this part of the pin. Thus, there is an overall reduction in peak stress within pin 190. As nut 193 is rotated to effect a preload upon tube expander 192, the preload force effected upon chamfered shoulder 191 is effectively centered along chamfer 198 of tube expander 192. Since castellated nut 193 may be utilized, there is an improved retention of the preload effected by the advancement of nut 193 along threaded end 194. Because this is a result of increased elasticity of the overall joint comprising nut 193, threaded end 194, tube expander 192 and pin 190, this preload force can be maintained by the tangential strain or hoop stress induced in tube expander 192 and chamfered shoulder 191 of the pin. The elastic deformation of the engagement of chamfered shoulder 191 with chamfer 198 at a given nut 193 preload will depend upon the angle of the chamfers relative to the axial centerline of pin 190. Permanent deformation can be effected by increasing the relative angle between chamfered shoulder 191 and chamfer 198 of expander 192. Additionally, the utilization of castellated nut 193 enables the use of wire or cotter pin 200 to effect locking in place of nut 193 and retention of the nut preload.

Figure 4:
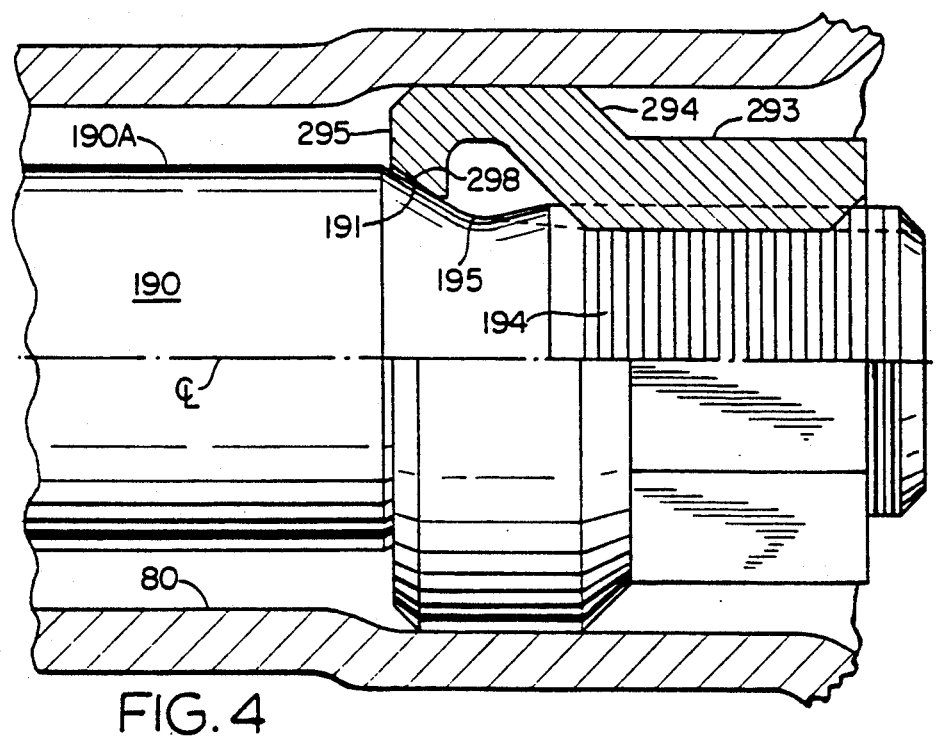
FIGS. 4–6 are detailed section views of alternative embodiments of the present invention.
Figure 5:
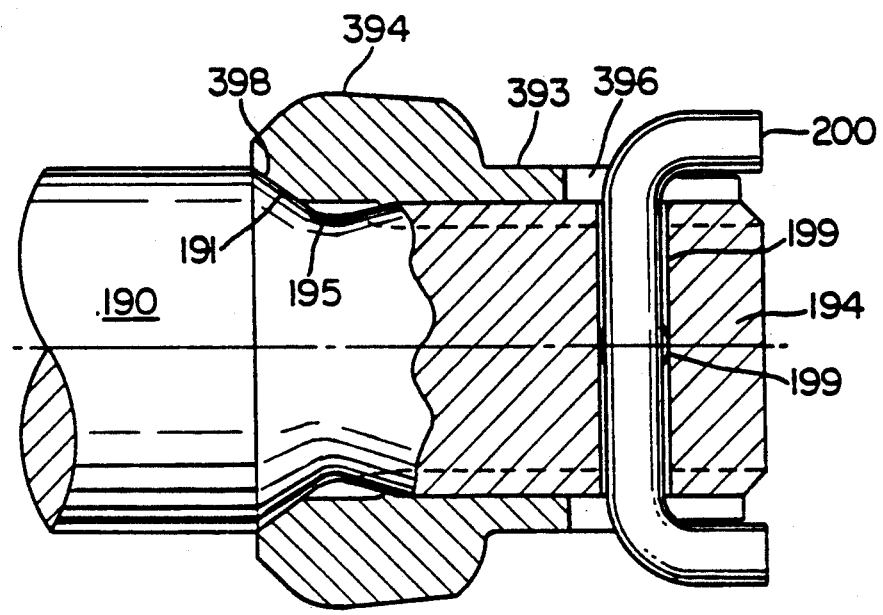
Figure 6:
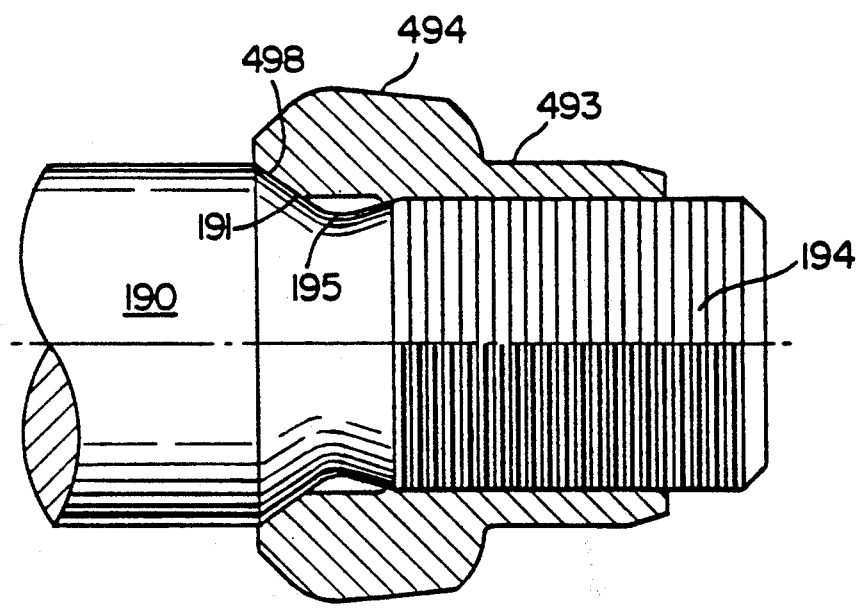

FIGS. 4-6 illustrate alternative embodiments in which tangential and bending stresses are induced in the expander portion of the adjuster by means of installed preload, and the tube expander and nut are combined into a single structure. Pin 190 is disposed within adjuster tube 80 and includes threaded end 194, small diameter portion 195, and chamfered shoulder 191. Self-locking expander nut 293 includes enlarged radially extending end portion 294 which is shaped generally like an inverted C with the opening of the C directed toward the threaded end 194. Radial interior end 295 of nut 293 includes inner diameter chamfer 298 which engages chamfered shoulder 191 of pin 190. As nut 293 is advanced along the threads of threaded end 194, enlarged radially extending end portion 294 deforms outwardly against expander tube 80 as a result of the engagement of chamfered shoulder 191 and chamfer 298. Chamfer 298 may have a slightly different angle (before deformation) compared to the angle of chamfered shoulder 191, relative to the centerline of pin 190. A self-locking of the nut is effected, and the preload of the nut against pin 190 is maintained.

FIG. 5 illustrates another embodiment of the improved brake adjuster mechanism in accordance with the present invention. Pin 190 includes threaded end 194 having a pair of transverse openings 199, one of which is shown completely in the cross section view. A castellated nut 393 includes a plurality of openings 396 through which the locking means comprising a wire or cotter pin 200 may extend. Nut 393 includes expander portion 394 having an inner diameter chamfer 398 which engages chamfered shoulder 191 of pin 190. As castellated nut 393 is advanced along threaded end 194, chamfer 398 engages chamfered shoulder 191 and deforms in a manner similar to expander 192. Alternatively, FIG. 6 illustrates a nut 493 having an end 494 with a chamfer 498 engaging a pin shoulder 191. Threaded end 194 and nut 493 includes self-locking threads which enable nut 493 to remain in position on pin 190 without the utilization of cotter pin or wire 200.

The improved brake adjuster mechanism of the present invention has been shown to be effective during testing thereof When the angle of the chamfers and/or shoulders of the mechanism of FIG. 3 are approximately 35° each relative to the centerline of the adjuster pin, it has been found that the amount of the rotation of the nut which effects a variation of preload or torque upon the pin has been increased significantly so that any rotation of the nut relative to the pin will effect a correspondingly smaller degree of variation of the nut preload upon the tube expander. Axial load cycle testing has shown the adjuster mechanism of FIG. 3 to be at least as resistant to axial fatigue as prior adjuster mechanism designs. Also, vibration testing has shown a noticeable improvement wherein chamfers and/or shoulder angles of 30° resulted in no failure of the adjuster mechanism over a time period that was more than three times longer then a time period in which a prior adjuster mechanism experienced failure. Overall, the adjuster mechanism of the present invention illustrated improved performance and reliability.

I claim:

1. In a brake piston adjuster mechanism, comprising a deformable member disposed within and connected with a piston, a deforming member received within said deformable member and engaging the deformable member, the deforming member comprising a pin having a threaded end, an expander member disposed about an exterior smaller diameter portion of said pin and adjacent the threaded end, a nut threaded on said threaded end and engaging said expander member, a chamfered pin shoulder disposed between an outer pin diameter and said smaller diameter portion and spaced axially apart from said threaded end, and the expander member having at least one inner chamber which engages the chamfered pin shoulder, the expander member maintained axially in place between the nut and chamfered pin shoulder such that forces imparted by the nut upon the expander member are transmitted to the chamfered pin shoulder and impart tangential stress in the expander member.

2. The brake piston adjusted mechanism in accordance with claim 1, wherein the nut comprises a castellated nut.

3. The brake piston adjuster mechanism in accordance with claim 2, wherein the threaded end includes a transverse opening therethrough, and locking means extends through the castellated nut and transverse opening.

4. The brake piston adjuster mechanism in accordance with claim 3, wherein the nut includes a larger diameter end having a radially extending face which engages said expander member.

5. In a brake piston adjuster mechanism comprising a deformable member disposed within and connected with a piston, a deforming member received within and engaging the deformable member, the deforming member comprising a pin having a large diameter portion extending via a chamfered pin shoulder to a smaller diameter portion and a threaded end spaced axially apart from the chamfered pin shoulder, an expander nut having internal threads engaging the threaded end of the pin and including a radially extending end portion which engages and deforms the deformable member, the end portion being nonthreaded and generally in the cross-sectional shape of a C which opens radially inwardly toward the threaded end of the pin, a radially interior end of said end portion including a chamfer which engages the chamfered pin shoulder such that advancement of the nut along the pin by rotation of said nut about the threaded end of the pin causes the end portion of the nut to deform radially outwardly away from said pin and towards said deforming member.

6. The brake piston adjuster mechanism in accordance with claim 5, wherein the end portion deforms longitudinally when the nut is rotated along the pin.

7. In a brake piston adjuster mechanism comprising a deformable member disposed within and connected with a piston, a deforming member received within and engaging the deformable member, the deforming member comprising a pin having a large diameter portion extending via a chamfered shoulder to a smaller diameter portion and a threaded end spaced axially apart from the chamfered shoulder, an expander nut located exteriorly about the pin and having internal threads engaging the threaded end of the pin and including a radially extending, nonthreaded end portion which engages and deforms the deformable member, the end portion including a radially interior chamfer which engages the chamfered pin shoulder such that advancement of the nut along the pin by rotation of said nut about the threaded end of the pin results in an engagement of the chamfer with the chamfered shoulder which imparts tangential stress to the end portion.

8. The brake piston adjuster mechanism in accordance with claim 7, wherein said nut comprises a castellated nut having a plurality of longitudinally extending openings thereabout, and the threaded end of the pin has at least one transverse opening, and locking means extending through said transverse opening and castellated nut in order to maintain the nut in position on the threaded end.

* * * * *